United States Patent Office 3,411,489
Patented Nov. 19, 1968

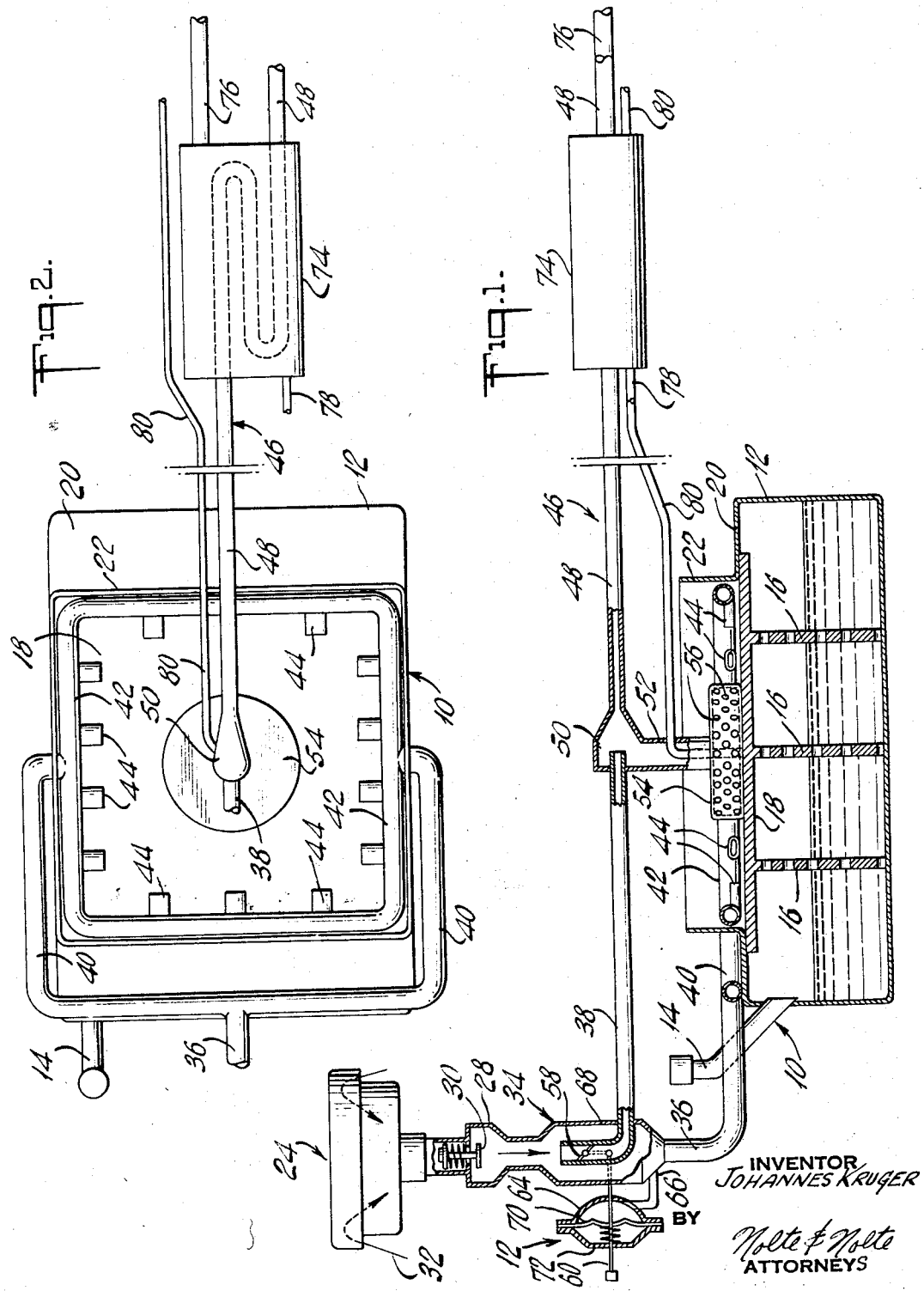

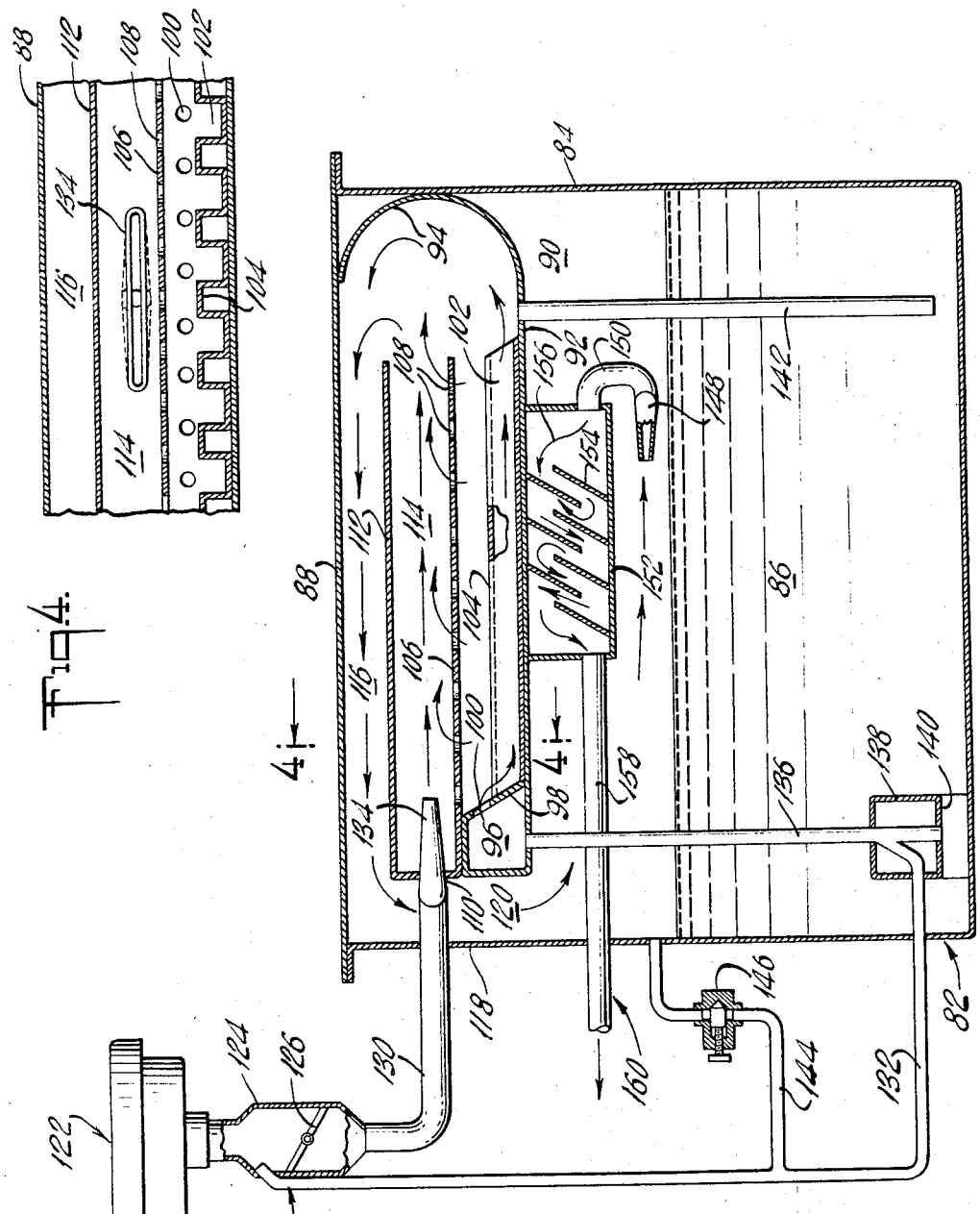

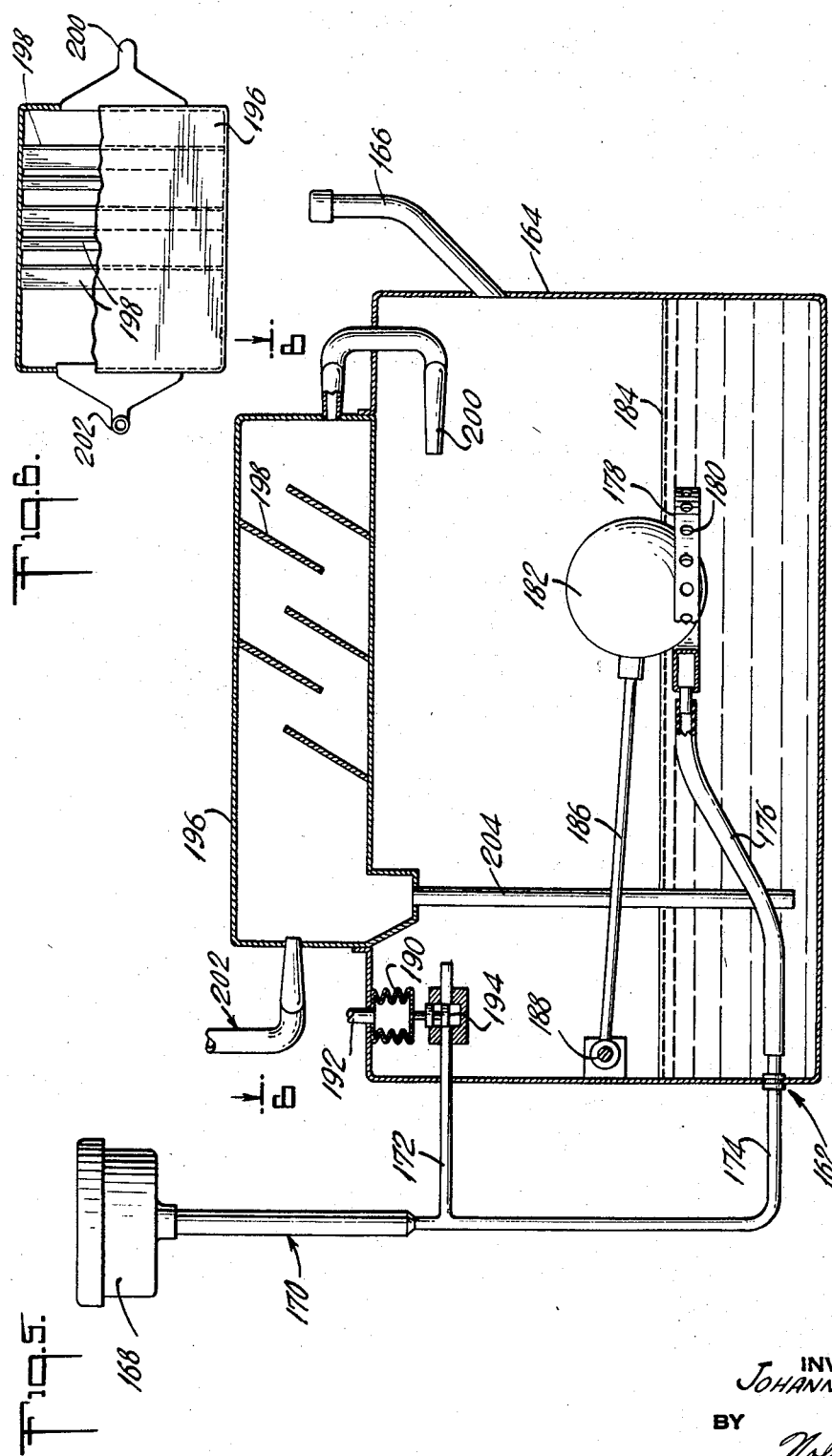

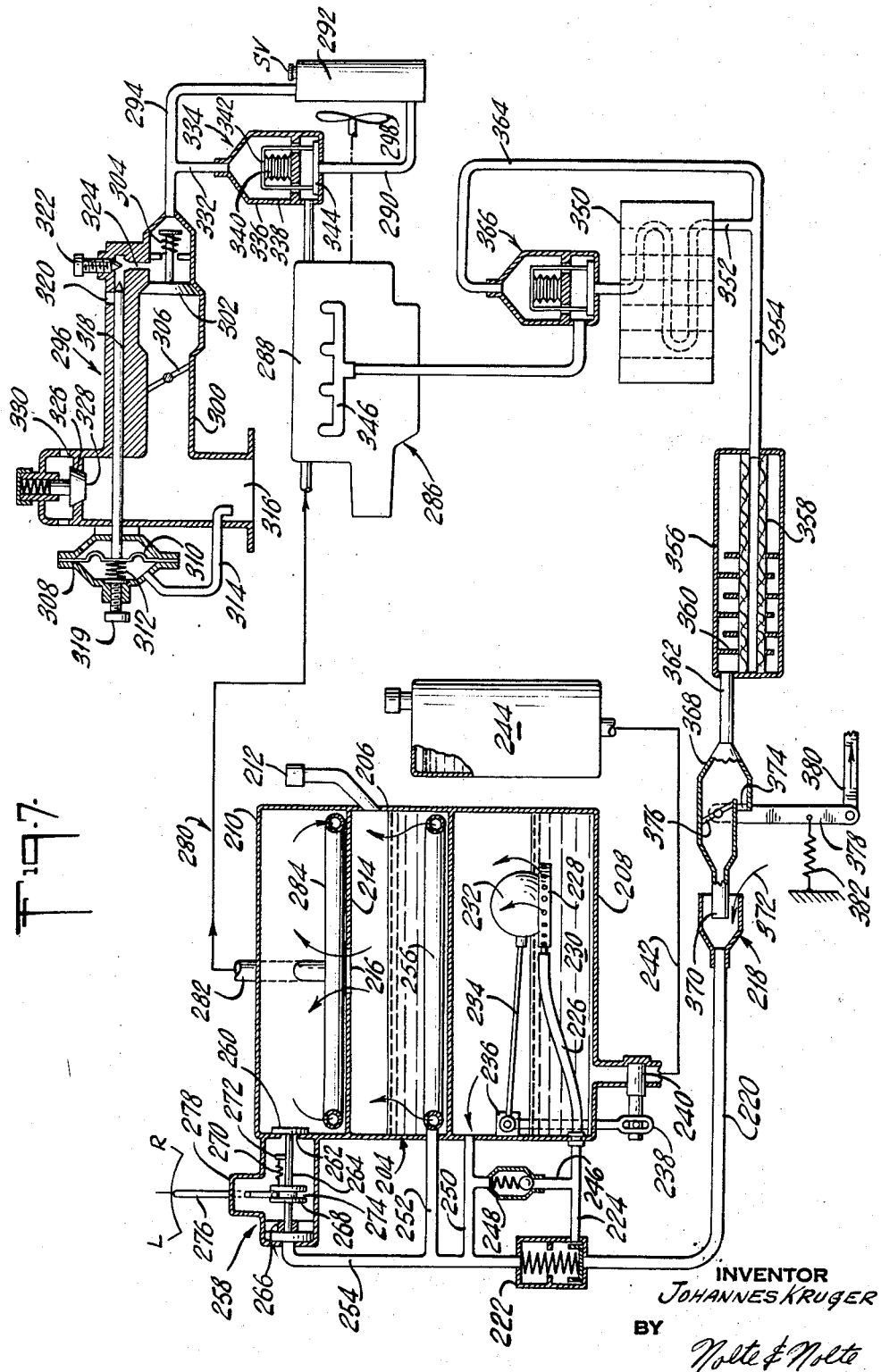

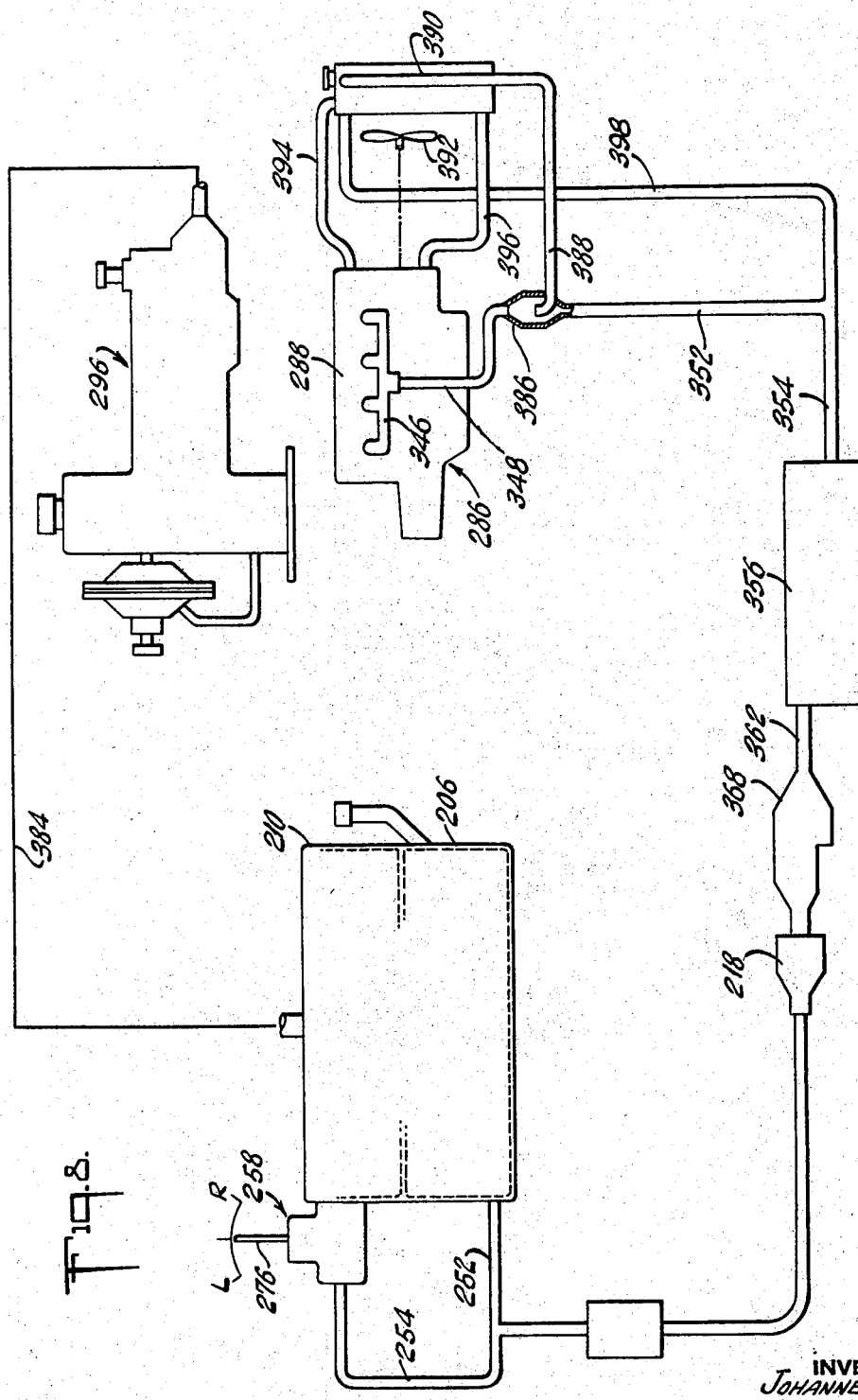

3,411,489
FUEL SUPPLY SYSTEMS FOR INTERNAL COMBUSTION ENGINES
Johannes Kruger, Esplanade, Durban, Republic of South Africa, assignor of ten percent interest to Edward B. Hunter, New York, N.Y.
Filed Dec. 22, 1966, Ser. No. 603,954
29 Claims. (Cl. 123—133)

ABSTRACT OF THE DISCLOSURE

Systems for supplying fuel-air mixtures to the suction inlet of an internal combustion engine and having controls to regulate the richness of the mixture. Part of the inlet air has intimate contact with the fuel and another part, which does not intimately contact the fuel, is combined with the air which is rich in fuel before reaching the engine. The fuel-air mixture is used instead of water to cool the engine so as to be heated thereby. Part of the exhaust gases are directed to the air inlet so as to be recirculated through the engine, and the exhaust gases are used to circulate cooling water through the engine before the exhaust gases reach the air inlet so that the exhaust gases have been placed in contact with water before reaching the air inlet. Also an arrangement is provided where a separate supply of water contacts the air before it is directed into contact with the fuel, and before it reaches the suction inlet of the engine.

---

At the present time carburetors which are used to provide predetermined fuel-air mixtures for internal combustion engines are exceedingly complex and delicate and do not always provide the best possible operations for the engine under all atmospheric conditions, both with respect to temperature and barometric pressure as well as with respect to humidity of the atmosphere.

It is a primary object of the present invention to provide for internal combustion engines a fuel supply system which is far simpler than and less delicate than conventional carburetors while at the same time acting in a far more reliable manner to provide the engine with an ideal fuel-air mixture under various operating conditions of the engine as well as under varying atmospheric conditions.

A further problem encountered in modern internal combustion engines resides in the cooling thereof, this cooling usually requiring a water circulating system which includes a water pump for circulating the water therethrough. The water pumps break down and have faulty operations creating problems in the operation of the engine.

It is a further object of the present invention to provide a fuel supply system which will eliminate the need for a water pump and which in addition is capable of cooling the engine with the fuel mixture itself rather than with water, although it is also an object of the invention to provide a system where cooling water is circulated through the engine without the use of a water pump.

A further problem which is encountered with modern internal combustion engines is the release of toxic fumes to the outer atmosphere from the exhaust.

An additional object of the present invention is to provide a fuel supply system which will recirculate through the engine part of the exhaust gases so as to reduce the extent to which the atmosphere receives toxic exhaust gases from an internal combustion engine.

Also, it is an object of the invention to provide for systems of the above type various types of controls, both manual and automatic, for achieving an ideal mixture under all operating conditions as well as for regulating the extent to which exhaust gases are recirculated so that when driving in crowded cities, for example, less exhaust gases will be released to the outer atmosphere than when driving on the open highway away from cities where release of larger amounts of exhaust gases to the atmosphere is not so undesirable.

The structure of the invention includes a fuel tank for containing a supply of fuel and an air inlet means through which air is admitted to the fuel tank, a supply conduit means communicating with the air inlet means to receive air therefrom and having fuel and air branches which direct air to the region of the fuel tank with the fuel branch providing a stream of air which has a contact with the fuel which is far more intimate than contact of air derived from the air branch. Thus, a richer mixture is provided by way of the fuel branch of the supply conduit means than the air branch thereof.

A suction conduit means communicates with the tank to receive air from both of these branches and to direct it to a suction inlet of the engine, so that in the suction conduit means air from both branches mingles to provide a predetermined fuel-air mixture for the engine. The suction conduit means can direct the mixture through a cooling jacket of the engine, which does not contain any water, so that the fuel-air mixture itself cools the engine and becomes heated thereby before reaching the suction inlet.

Also, an exhaust gas conduit means can communicate with the air inlet for delivering at least part of the exhaust gases thereto, and in the case where there is water in the water jacket the exhaust gases themselves are directed through the water jacket to circulate the water therethrough before the exhaust gases reach the air inlet or are released in part to the outer atmosphere. If the exhaust gases are not used to circulate cooling water through the engine, a separate water tank is provided to form a water-contact means providing contact between air of the air inlet and water before the air reaches the fuel and air branches of the supply conduit means, and in this way the air is conditioned by contact with the water so as to provide a superior fuel-air mixture.

The invention is illustrated by way of example in the accompanying drawings which form part of this application and in which:

FIG. 1 is a partly sectional side elevation schematically illustrating one possible embodiment of a fuel vaporizer according to the invention;

FIG. 2 is a top plan view of the structure of FIG. 1, some of the parts of FIG. 1 being omitted for the sake of clarity;

FIG. 3 is a schematic sectional elevation of another embodiment of a fuel vaporizer according to the invention;

FIG. 4 is a fragmentary transverse sectional illustration of part of the structure of FIG. 3, FIG. 4 being taken along line 4—4 of FIG. 3 in the direction of the arrows;

FIG. 5 is a schematic sectional elevation of a further embodiment of the fuel vaporizer according to the invention;

FIG. 6 is a fragmentary top plan view of the structure of FIG. 5 taken along line 6—6 of FIG. 5 in the direction of the arrows;

FIG. 7 is a schematic partly sectional side elevation of a further embodiment of a fuel vaporizing system according to the invention, FIG. 7 further illustrating how the fuel is used with an internal combustion engine according to further features of the invention; and FIG. 8 is a partly sectional schematic illustration of yet another embodiment of a fuel vaporizer according to the invention, FIG. 8 also showing how, according to further features of the invention, the fuel is used with an internal combustion engine in a manner different from that illustrated in FIG. 7.

Referring now to FIGS. 1 and 2, the fuel vaporizer 10 shown therein includes a fuel tank 12 capable of being supplied with fuel through an inlet 14, which is indicated in FIG. 1. In the illustrated example the tank 12 is of a square or rectangular configuration, as is apparent from FIG. 2. Situated in the interior of the tank 12 are a plurality of vertical apertured felt plates 16 which rest on the bottom wall of the tank and which are connected at their top ends with a horizontal felt wall or plate 18, so that the latter is soaked with the fuel. The top wall of the tank 12 has an inwardly extending peripheral portion 20 which overlaps the outer periphery of the horizontal felt plate 18, and inwardly of the outer periphery of the plate 18 the horizontal peripheral top wall 20 of the tank 12 is joined with an upwardly extending substantially square wall portion 22 which may carry at its top edge any suitable cover, not shown.

An air inlet means 24 is situated in the region of the tank 12 and includes a suitable filter assembly 26 or the like through which air is drawn into a tubular air guide 28 provided with a spring-pressed non-return valve assembly 30, so that the air can flow, after passing through the inlet means 24 in the manner shown by the arrows 32, downwardly into a supply conduit means 34 of the present invention. This supply conduit means 34 includes a fuel branch 36 which places the air which flows therethrough in relatively intimate contact with fuel, and the supply conduit beans 34 further includes an air branch 38 which provides for a flow of air which does not come into intimate contact with the fuel, so that the air which flows through the branch 36 of the conduit means 34 will have a far richer mixture than the air which flows through the branch 38.

The fuel branch 36 of the conduit means 34 has a substantially C-shaped portion 40 (FIG. 2) the ends of which communicate with an endless tubular portion 42 of the branch 36, this portion 42 being of a substantially square configuration and being closely surrounded by the upwardly directed wall 22 of the tank 12. The free ends of the C-shaped portion 40 extend through suitable openings of the wall portion 22 so as to support the endless portion 42 of the branch 36 at an elevation which is quite close to and just above the felt plate 18. The endless conduit portion 42 forms a header for a series of discharge nozzles 44 of the fuel branch 36 of the conduit means 34, so that in this way air which flows through the fuel branch 36 will discharge through the nozzles 44 and flow across the top of the plate 18 toward a central portion thereof. In this way, the air from the fuel branch 36 will directly contact the fuel-rich vapors situated just over the plate 18 to be enriched thereby.

A suction conduit means 46 communicates with the tank 12 for receiving at the latter air from the air branch 38 as well as from the fuel branch 36 of the supply conduit means 34, and this suction conduit means 46 delivers the air to the suction inlet of an unillustrated internal combustion engine. The suction conduit means 46 includes an elongated conduit 48 which at its left end, as viewed in FIG. 1, has an enlarged portion 50 communicating with the air branch 38 so as to receive from the latter air which has not been enriched with fuel. The enlarged portion 50 has a downwardly extending tubular portion 52 which terminates in a hollow inlet 54 which forms the inlet of the suction conduit 46, and this hollow inlet 54 is of a substantially circular configuration and, if desired, may be provided with a bottom wall, or it may simply have a bottom open end and located at its lower periphery at the region of the upper surface of the plate 18, as shown in FIG. 1. The circular peripheral side wall of the cylindrical hollow inlet 54 of the suction conduit means 46 is formed with a plurality of perforations 56, so that the air streams which issue from the nozzles 44 and flow across the top of the plate 18 to become enriched with fuel vapors will pass through the perforations 56 into the hollow inlet 54 so as to flow upwardly along the tubular extension 52 of the enlarged portion 50 of the conduit means 46 and then along the conduit 48 thereof. At the enlarged portion 50 the fuel-enriched air derived from the fuel branch 36 will mingle with the unenriched air derived from the air branch 38 and the combined air, which forms a homogeneous mixture when received in the conduit 48, will flow along the latter to the suction inlet of the engine.

It is apparent that the richness of the mixture which flows through the suction conduit means 46 can be regulated by controlling the amount of air which is derived from the air branch 38 so as to be added to the enriched air derived from the fuel branch 36. For this purpose the air branch 38 is provided in its interior with a throttle valve 58 capable of being manually regulated by way of a manually operable rod 60 which is shown schematically in FIG. 1, it being understood that through a suitable linkage this rod 60 can be actuated from the dash panel of a vehicle which is driven by an internal combustion engine which is supplied with fuel by the fuel vaporizer 10 of the invention.

However, it is also possible to control the valve 58 automatically by providing the diaphragm-control assembly 62 which includes a hollow housing 64 communicating through a tube 66 with the conduit means 34 at the upstream end of the fuel branch 36 thereof. The part 68 of the conduit means 34, where the branches 36 and 38 communicate with each other, will be under a certain vacuum resulting from the suction derived through suction conduit means 46, and this vacuum will, through the tube 66, influence the flexible diaphragm 70 which is acted upon by a spring 72 and which is fixed with the rod 60 so as to automatically control the position thereof and thus automatically control the position of the valve 58 to provide in this way a uniformly rich mixture with the amount of air which is added to the mixture from the air branch 38 being increased or decreased automatically according to the extent of suction provided through the suction conduit means 46.

In addition, as is schematically shown in FIGS. 1 and 2, the suction conduit means 46 has its conduit 48 passing through a muffler 74 which receives the exhaust gases through a conduit 76 and discharges them through a conduit 78, so that in this way the mixture provided through the suction conduit means 46 will be heated in the muffler before reaching the engine.

Also, FIGS. 1 and 2 show an idling conduit 80 which forms part of the suction conduit means 46 and which passes directly through the extension 52 in the hollow portion 54 so as to directly receive a rich mixture to which no air is added, this idling conduit 80 extending alongside the muffler 74 so as to heat the rich mixture which is delivered thereby to the engine in a well known manner during idling operations. If desired, the idling conduit 80, or a part thereof, could also pass through the muffler 74, but by situating it close to the muffler it will in any event receive heat therefrom.

Thus, with the above-described relatively simple structure of FIGS. 1 and 2 it is possible to provide a rich mixture for idling purposes and, during normal operations, a fuel air mixture whose richness will be automatically determined according to the suction of the engine. The valve 30 shuts off the inlet when there is no suction, and at any time the operator may actuate the rod 60 manually so as to override the automatic controls for the richness of the mixture.

Referring now to FIGS. 3 and 4, there is shown therein a fuel vaporizer 82 which includes a fuel tank 84 into which a supply of fuel 86 may be delivered in any suitable way. The tank 84 is covered by a top wall 88 and has a pair of opposed side walls 90, one of which is visible in FIG. 3.

Extending between and fixed to the side walls 90 is a horizontal wall 92 which at its right end, as viewed in FIG. 3, has a curved portion 94 also extending between and fixed to the side walls 90 and having in cross section the configuration of a semicircle. At the left end of the wall 92, as viewed in FIG. 3, an extension thereof, which also extends between and is fixed to the side walls 90, is directed backwardly upon itself to form an elongated, horizontal fuel reservoir 96 extending between the side walls 90, and this reservoir 96 has an inclined wall 98 formed with a plurality of apertures 100, which are shown most clearly in FIG. 4. The inclined wall 98 forms the left end, as viewed in FIG. 3, of an elongated tray 102 which is provided with elongated corrugations 104 extending longitudinally of the tray 102, as is apparent from FIGS. 3 and 4.

A perforated wall 106 is situated in a horizontal plane above the tray 102, engaging the top wall of the reservoir 96 and extending between and fixed to the side walls 90, and this horizontal wall 106 is provided with a plurality of perforations 108 passing therethrough. At its left end, as viewed in FIG. 3, the perforated horizontal wall 106 has a vertical extension 110 which extends between and is fixed to, the side walls 90, and the top edge of extension 110 is fixed to, and may in fact be formed integrally with, an upper wall 112 which extends between and is fixed to the side walls 90 and which is situated above the perforated wall 106 so as to define an elongated space 114 therewith, this space being open at its right end, as viewed in FIG. 3, and closed at its left end by the wall 110. The wall 112 is of course situated beneath the wall 88 to define with the latter a space 116, and the wall 110 as well as the left wall of the reservoir 96, as viewed in FIG. 3, are situated in a common plane which is spaced to the right from the wall 118 of the tank 84 so as to define therewith a space 120.

The fuel reservoir 82, in addition to including the above-described tank structure, includes an air inlet means 122 having a suitable filter through which air flows into the elongated tubular chamber 124 in which is located a throttle valve 126. This is a choke valve which controls the flow of air in accordance with the demand of the engine. The tubular chamber 124 forms the inlet end of a supply conduit means 128 which includes an air branch 130 and a fuel branch 132. The air branch 130 forms an extention of the chamber 124 down-stream of the choke valve 126 and passes fluid-tightly through the wall 118 to terminate in an elongated, horizontal, nozzle outlet 134 situated in the space 114 and extending fluid-tightly through the wall 110. The configuration of the nozzle outlet 134 is also apparent from FIG. 4.

A fuel supply tube 136 communicates at its top end with the reservoir 96 and at its bottom end with the fuel 86 adjacent to the bottom wall of the tank 84. In the construction of FIG. 3 the bottom open end of the tube 136 is carried by a suitable substantially U-shaped hollow support 138 which may be fixed to or rest on the bottom wall of the tank 84 and which has a central bottom wall portion 140 spaced from the bottom wall of the tank so that in this way the bottom open end of the tube 136 is maintained open for receiving fuel 86 from the tank 84. In addition, there is a fuel return tube 142 which receives fuel from the tray 102 and directs it back into the body of fuel 86 in the lower part of the tank 84.

The fuel branch 132 of the supply conduit means 128 extends fluid-tightly through the wall of the tank 84 and communicates with the fuel supply tube 136, so that air which flows through the fuel supply branch 132 passes upwardly along the interior of the fuel supply tube 136 to act as pumping air for pumping fuel into the reservoir 96 together with the air derived from the fuel branch 132. In this way, the air from the fuel branch 132 is brought into intimate contact with the fuel 86 which flows with the air upwardly along the fuel supply tube 136. Thus, a rich mixture of fuel and air is provided for the air derived through the fuel branch 132. A bypass 144 whose cross sectional flow can be regulated by a valve 146 provides direct communication between the fuel branch 132 and the space in the tank 84 over the fuel 86 therein, this bypass 144 providing a constant speed for the air which is released from the fuel branch 132 to flow upwardly along the fuel supply tube 136.

The air which is in the tank 84 over the fuel 86 therein is received in a suction inlet 148, which may have the same structure as the nozzle 134 and which communicates through a tube 150 with the hollow interior of a baffle box 152 in which baffles 154 are located so as to provide for the air a zig-zag path of flow, as indicated by the arrows 156. It is only after passing the baffles 154 that the air reaches the suction conduit 158 of the engine which together with the baffle box 152, the tube 150, and the suction inlet 148 forms the suction conduit means 160 through which the fuel-air mixture is delivered to the suction inlet of the engine.

With the above-described structure of FIGS. 3 and 4, during operation of the engine there will be suction applied through the suction conduit means 160 so that air is drawn into the inlet 148, and of course the result is that air will be drawn through the air inlet 122 so as to flow past the valve 126 and along the air branch 130 and the fuel branch 132. The fuel branch 132 will provide in the reservoir 96 air and fuel which flow out through the openings 100 and along the tray 102, the fuel draining back into the tank through the return flow tube 142, while the air which is rich in fuel flows upwardly through the apertures 108 of the apertured wall 106 to join the relatively dry air received from the air branch 130 in the space 114. From the space 114 the mixed dry and rich air is directed by the curved baffle 94 into the space 116, and from the latter the mixture flows through the space 120 into the space over the fuel in the tank 84 to be received in the suction inlet to flow from the latter through the baffle box 152, in which the mixture is partially dried with excess fuel returning through the inlet 148, so that a pure mixture of fuel and air is delivered through the suction conduit means 160 to the engine.

Thus, with the embodiment shown in FIGS. 3 and 4 it is unnecessary to use felt plates, as in the case of FIGS. 1 and 2, and in addition there is a double area in using the upper and lower portions of the tank for the purpose of picking up vapors. Also, it will be noted that there is a built-in fuel-separator formed by the baffle box 152. In the baffle box there is the advantage of drying out the richest vapors so that a pure homogeneous mixture is provided for feeding the engine.

FIGS. 5 and 6 illustrate a particularly simple embodiment of a fuel vaporizer according to the present invention. The fuel vaporizer 162 illustrated therein includes the fuel tank 164 capable of being filled in any suitabe way, as through an inet 166. This embodiment also has an air inlet means 168 provided with a suitable filter through which the air is sucked into the apparatus, and the air inlet means delivers the air to the supply conduit means 170 which has the air branch 172 and the fuel branch 174.

The fuel branch 174 passes fluid-tightly through a wall of the tank 164 and communicates with a flexible tube 176 which in turn communicates with a hollow ring 178 provided at its outer periphery with a plurality of apertures 180 through which air from the fuel branch 174 escapes.

The ring 178 is fixed to a float means 182 which guarantees that the ring 178 is maintained at all times at a given distance below the surface 184 of the fuel in tank 164. This float means 182 can be in the form of any hollow member capable of floating on the fuel and fixed to one end of a lever 186 which is pivoted to a bracket 188 carried by a wall of the tank 164 in the interior thereof. Thus, with this arrangement the fuel branch will always supply air which bubbles up through a given depth of fuel before reaching the space in the tank over the fuel therein.

The air branch 172 passes fluid-tightly through a wall of the tank to communicate with the interior thereof in the space over the fuel therein, and a built-in vacuum control is provided to regulate the amount of air which flows through the air branch 172 into the tank 164. Thus, the hollow interior of a bellows 190 communicates through a suitable tube 192 with the inlet manifold of the engine, for example, and in response to movement of the bellows 190 a valve 194 will be displaced to control the passage of air through the air branch 172 into the interior of the tank 164. In this way a built-in vacuum control regulator controls the amount of air which is combined from the branch 172 with the fuel-enriched air derived from the fuel branch 174.

With the embodiment of FIG. 5 a baffle box 196 is situated on top of the tank and includes in its interior a plurality of baffle plates 198, A hollow inlet 200 communicates with the space in the tank over the fuel therein and delivers the air from the air and fuel branches into the baffle box 196 so as to flow therethrough to the suction conduit means 202 which delivers the fuel-air mixture to the engine. The suction conduit means 202 and the inlet 200 both have enlarged ends communicating with the baffle box 196, as indicated in FIG. 6. The baffle box 196 serves to dry the mixture partially before it reaches the suction conduit means 202, and the excess fuel returns to the tank through the return flow tube 204 which communicates at its upper end with the interior of the baffle box 196 and at its lower end with the interior of the tank 164.

Thus, with this exceedingly simple embodiment of a fuel vaporizer according to the invention, there is the advantage that a rich vapor is directly achieved by mounting the outlet of a fuel branch on the float means. The built-in vacuum control means 190, 194 regulates the richness of the mixture in a fully automatic manner so that it is adapted to the operation of the engine. Furthermore, it will be noted that with this arrangement it is possible to very conveniently locate the baffle box 196 on top of the tank, and only a single simple box-like tank structure is required.

In the embodiment of the invention which is illustrated in FIG. 7 there is also a fuel vaporizer 204, according to the invention, which includes a fuel tank 206 in which the fuel is located. However, in this embodiment the fuel tank 206 is situated between a water tank 208, which is located beneath the fuel tank 206, and in air chamber 210 which has an interior space communicating with the space in the fuel tank 206 over the fuel therein. The fuel tank 206 can be filled in any suitable way, as through an inlet 212, and the chamber 210 and tank 206 are separated by a horizontal partition 214 formed with a central opening 216 through which the air space in the tank 206, over the fuel therein, communicates with the interior of the chamber 210.

This embodiment has an air inlet means 218 in the form of a hollow tube which is open at its right end, as viewed in FIG. 7, so as to always communicate with the outer atmosphere. The tubular inlet communicates with a conduit 220 through which air is supplied to a valve 222 which is urged to its closed position by a relatively soft spring so that the valve 222 will easily open to admit air into a water branch 224 through which the air flows into the water tank 208 to be received in a flexible tube 226 therein. This tube 226 communicates with an apertured ring 228, in much the same way that the flexible tube 176 communicates with the ring 178 of FIG. 5, and the ring 228 is submerged within the water 230 in the tank 208, so that the air which flows into the water tank bubbles up through the water therein to receive oxygen from the water and to be humidified by the water, and in this way the operation of the engine will be enhanced. For this purpose suitable oxygen additives may be added to the water 230, if desired.

The ring 228 is fixed to a float means 232 so as to be maintained submerged by the latter, this float 232 taking the form of any suitable float member which can float on the water 230 so as to maintain the ring 228 submerged. The float 232 is fixed to a lever 234 which is pivotally carried by a bracket 236, and a pivot shaft which is fixed to the lever 234 extends fluid-tightly through a tank wall to the exterior where this shaft is fixed to a lever 238 formed at its bottom end with an elongated slot receiving a pin fixed to a valve 240 so as to automatically open and close the latter in response to the movement of the float 232. The valve 240 communicates through a conduit 242 with a water tank 244 which can be filled with water in any suitable way, and thus with this construction when the water level in the tank 208 reaches a certain lower limit, water will automatically be admitted to the tank 208 to raise it to a predetermined upper limit, after which the valve 240 will automatically close. Thus, a pre-determined level of water is maintained in the tank 208.

The conduit 224 communicates with a bypass 246 in which is situated a limiting valve 248 which automatically opens if the pressure becomes excessive, so that in this case some of the air will flow directly from the conduit 224 through the bypass 246 to the conduit 250 which communicates with the interior of the tank 208 over the water therein. The air which bubbles up through the water discharges from the tank 208 into the conduit 250, and it is from this conduit that the air reaches the fuel branch 252 and the air branch 254 of the supply conduit means 220 of this embodiment.

The fuel branch 252 passed fluid-tightly through the wall of the tank 206 into the area thereof where this fuel branch 252 terminates in a tubular ring 256 provided at its upper portion with a row of openings passing therethrough, so that the air of the fuel branch will bubble up through the fuel in the tank 206 and then pass out of the latter through the opening 216 into the chamber 210.

The air from the air branch 254 will enter directly into the chamber 210 through a suction inlet valve means 258. This valve means includes a valve member 260 capable of opening and closing an opening 262 in a wall of the air chamber 210, and the stem 264 of the valve 260 is guided in a suitable bearing 266.

In order to adjust the force required to open the valve 260, a ring 268 is slidable on the stem 264 and is connected to one end of a tension spring 270 the other end of which is fixed to a pin 272 which is fixedly carried by the stem 264. The ring 268 is formed with a peripheral groove 274 which receives one end of a turnable lever 276. The lever 276 is turnably carried by a wall of a housing 278 in which the valve stem 264 is slidable, this housing communicating with the air branch 254 and forming a part thereof. At the exterior of the housing 278 the lever 276 has an arm which, through any suitable linkage, can be adjusted by the operator so as to be maintained at a selected angle.

In the manner which is schematically shown in FIG. 7, the lever 276 coacts with a scale having at one end the symbol R designating a richer mixture and at its left end the symbol L designating a leaner mixture. As the operator turns the lever toward the end R of the adjusting scale, the tension of the spring 270 is increased, and a greater degree of vacuum is therefore required to open the valve 260, so that less air is admitted from the air branch 254 and a richer mixture is achieved. On the other hand, by displacing the exterior part of the lever 276 toward the end L of the scale, the tension in the spring 270 is reduced and a lesser degree of vacuum is required to open the valve 258, and in this way more air is admitted from the air branch 254 into the chamber 210, so that a leaner mixture is achieved.

A suction conduit means 280 is provided to receive the air from the chamber 210, and this suction conduit means includes an elongated suction conduit having a tubular inlet 284 situated within the chamber 210 and formed with apertures through which the air can enter into the suction conduit means 280.

The suction conduit means 280 serves to deliver the mixture to the suction inlet of the internal combustion engine 286 which is schematically indicated in FIG. 7. This engine 286 has a cooling jacket 288 with which the conduit 282 communicates. No water pump or water are used with the engine 286, the fuel-air mixture flowing from the conduit 282 through the jacket 288 so as to directly cool the engine and to receive heat therefrom. The heated fuel-air mixture, which thus cools the engine, flows from the water jacket 288 through a conduit 290 of the suction conduit means 280 and then through a radiator 292 after which the mixture, cooled at the radiator 292, is received in a conduit 294 of the suction conduit means 280. The conduit 294 communicates with a main mixture control means 296 from which the mixture is delivered to the engine cylinders. A suitable fan 298, driven by the engine, serves to draw cooling air through the radiator 292 so as to cool the mixture which flows through the tubes of the radiator into the conduit 294.

The main mixture control means 296 is relatively simple since it does not include any idling control. This main mixture control means 296 includes the housing 300 into which the mixture is admitted by a non-return valve 302 which is acted upon by a spring 304 and which automatically opens in response to suction, a choke valve 306 being provided to control the flow of the mixture through the control 296.

The housing 300 carries a diaphragm housing 308 in which a flexible diaphragm 310 is located, and this diaphragm is acted upon by a spring 312 which can have its force adjusted by an adjusting screw 314. The space at the left side of the diaphragm 310, as viewed in FIG. 7, communicates through a tube 314 with the suction inlet 316. Thus, in response to suction of the engine the axial position of an elongated rod 318 will be adjusted, this rod being fixed to the diaphragm 310 for movement therewith. The rod 318 controls the flow of air into the housing 300 upstream of the valve 302 through an inlet 320. While this inlet is shown closed by the rod 318 in FIG. 7, it will be understood that during operation the suction of the engine will retract the rod 318 to the left, as viewed in FIG. 7, to a given extent so as to regulate the amount of air which enters through the opening 320. The control in the flow of the air entering through the opening 320 is regulated by the conical bottom end of a screw 322 which is situated over and aligned with the upwardly flaring top end of a bore 324 of the housing 300, so that in this way the air from the outer atmosphere will be mixed with the air derived from the conduit 294, and thus the mixture will be regulated by the main mixture control 296 in a fully automatic manner.

The upper left portion of the housing 300 carries a partition 326 having an opening which can be opened and closed by a spring-pressed valve 328, and over the partition 326 are located apertures 330 communicating with the outer atmosphere, the valve 328 yielding in the case of back-firing but otherwise not entering into the operation.

In this way it will be seen that the fuel-air mixture is used on the one hand to cool the engine and on the other hand will be delivered to the suction inlet 316 through the suction conduit means 280.

A bypass conduit 332 extends between the conduits 290 and 294, bypassing the radiator 292, and within this bypass conduit 332 is situated a temperature-responsive control valve means 334 which will bypass the mixture directly from the jacket 288 to the conduit 294 when the engine is cold. For this purpose the temperature responsive valve means 334 has a housing 336 divided in its interior with a supporting wall 338 which carries a bellows 340 which expands and contracts in response to temperature changes. The bellows carries a substantially U-shaped member 342 which passes downwardly, with considerable clearance, through openings of the supporting wall 338 to carry below this wall a valve member 344 capable of opening and closing the openings of the wall 338. In the position of the part shown in FIG. 7 these openings are uncovered, and the valve 344 closes the conduit 290 to prevent the mixture from flowing from the jacket 288 into the conduit 290 and the radiator 292. Instead, in the illustrated position of the parts the mixture necessarily flows through the bypass 332 directly to the main mixture control 296. However, as the operating temperature increases the bellows 340 expands to raise the valve 344 and close the openings of the supporting wall 338, so that as soon as a given operating temperature is reached, which is to say as soon as the fuel-air mixture has been heated by the engine to a given temperature, the temperature-responsive valve means 334 will automatically close to direct the mixture through the radiator 292 before it reaches the main mixture control 296.

An exhaust gas manifold 346 receives the exhaust gases from the engine 286 and delivers the exhaust gases along the exhaust gas conduit 348 which communicates through a cooling unit 350 with an additional exhaust gas conduit 352. This cooling unit 350 includes in its interior a sinuous tube carrying suitable fins so that in this way the exhaust gases will be cooled, when flowing through the unit 350, before reaching the conduit 352. From the latter the exhaust gases flow through an exhaust gas conduit 354 into a muffler 356. Within the mufffler 356 is located a tubular mesh filter 358 which filters the exhaust gases, after which the exhaust gases flow past the baffles 360 to reach the discharge 362 of the muffler 356.

The exhaust gas conduit means formed by the conduits 348, 352 and 354 are operatively connected with a bypass 364 which carries a temperature-responsive valve means 366 identical with the temperature responsive valve means 334 and operating in the same way. When the engine is cold, so that the exhaust gases are cold, the valve 366 prevents communication between the conduit 348 and the cooling unit 350 and instead the exhaust gases are bypassed through the conduit 364 to the conduit 354. However, when the temperature of the exhaust gases reaches a given value, the valve 366 will automatically open the path to the cooling unit 350 while closing the bypass 364.

The discharge conduit 362 of the muffler 356 communicates with an elongated tubular housing 368 which has itself a discharge outlet 370 feeding the exhaust gases directly into the air inlet 218 to mix with air received therein from the outer atmosphere, as shown by the arrow 372, so that in this way part of the exhaust gases are recirculated through the apparatus of the invention to prevent the contamination of the outer atmosphere by the exhaust gases to a considerable extent. The housing 360 has an outlet 374 in constant communication with the outer atmosphere so that part of the exhaust gases will always flow out through the outlet 374 while another part thereof can be received from the discharge 370 into the air inlet means 218. Situated within the housing 368 downstream of its outlet 374 is a choke valve 376 which can be adjusted by a lever 378 connected through a suitable linkage 380 to the dash of the vehicle so that the operator can adjust the position of the valve 376, and a suitable spring 382 is connected with the lever 378 so as to urge the valve 376 toward a closed position. It is to be noted, however, that the valve 376 is never fully closed and that at all times there is at least a small path of flow for at least a small amount of exhaust gases into the inlet 218.

The embodiment of the invention which is illustrated in FIG. 8 is substantially similar to that of FIG. 7, except that in this embodiment there is no water tank and instead the jacket 288 of the engine 286 does have water situated therein. However, in this case also there is no water pump. Thus, it will be seen that with this embodiment the air which enters through the air inlet means 218 flows directly to the fuel branch 252 to be received therein in the fuel tank 206 which is identical with that of FIG. 7, and the air branch 254 receives air to flow through the inlet valve means 258 into the chamber 210 where the air from the air branch 254 will be combined with the air derived from the fuel branch 252. The suction conduit means 384 communicates with the chamber 210 to receive the mixture therefrom, but in this case the suction conduit means 384 communicates directly with the main mixture control means 296 which is identical with that of FIG. 7 and operates in the same way.

With the embodiment of FIG. 8, the exhaust manifold 346 delivers the exhaust gases to the exhaust gas conduit 348, 352 which in turn delivers them through the conduit 354 into the muffler 356 which is identical with that of FIG. 8 and from which the exhaust gases flow through the discharge 362 and the housing 368 to the inlet 218, this housing 368 carrying the same structure as that which is shown in FIG. 7 and being controlled in the same way.

However, it will be noted that in the embodiment of FIG. 8 the exhaust gas conduit 352 communicates at its upstream end with a tubular housing 386 from which part of the exhaust gases are withdrawn through a conduit 388 which communicates with the top end of the radiator 390 of this embodiment, this radiator being cooled by an engine-driven fan 392. The exhaust gases which flow through the conduit 388 flow across the hollow interior at the top of the radiator 390 to be received in a conduit 394 which communicates with the water jacket so that the exhaust gases flow through the water jacket mingling with the water therein, and then the exhaust gases together with part of the water flow through a conduit 396 into the radiator where the water and exhaust gas bubbles rise to the top of the radiator after which the exhaust gases can again circulate through the conduit 394 into the water jacket radiator. In this way the exhaust gases themselves, part of which are withdrawn through the conduit 388, are used to act as a pump for circulating the water of the cooling jacket through the radiator 390 and through the jacket, thus eliminating the need for a water pump.

Part of the exhaust gases which have thus been placed in contact with the cooling water of the engine 286 are received from conduit 398 in the muffler 356 to flow from the latter into the inlet 218, so that in this way, with this embodiment, it is by way of the exhaust gases themselves that contact is provided between the air and water. Thus, a water tank is not needed with the embodiment of FIG. 8, and instead the exhaust gases are used to pump the water and are used to supply the moisture-contacted air for the fuel-air mixture.

With the embodiments of the invention which are illustrated in FIGS. 7 and 8, it is possible to eliminate approximately 50% of the exhaust gases from release to the outer atmosphere, so that it is possible to greatly improve the extent to which toxic gases are released to the outer atmosphere, and air pollution is greatly reduced with this construction.

In addition, it will be noted that there is no water pump so that all of the complication involved in the use of a water pump are avoided with the embodiments of FIGS. 7 and 8. With the embodiment of FIG. 7 advantage is taken of the fuel-air mixture itself to be used as a cooling agent, and the fuel particles in this mixture will provide a very effective cooling by absorbing the heat quickly from the engine and producing in the same way a far more homogeneous mixture. This arrangement is highly economical, and the gases are cooled to a suitable temperature by the radiator so that the gases will be suitable for combustion in the engine.

With the embodiment of FIG. 8 the exhaust gases themselves will pick up some of the water particles and oxygen which greatly contributes to a high quality mixture for circulation through the system. Either through the water tank of FIG. 7 or through the exhaust gas system of FIG. 8 it is possible to achieve with the engine of the invention the same effect which is achieved with a conventional engine when it operates during humid weather, as when there is fog or rain. During such atmospheric conditions there is always more oxygen in the air, and the engine provides more power. This result is achieved at all times with the embodiments of FIGS. 7 and 8, which in addition can have suitable tablets of highly concentrated oxygen or other chemicals added to the water so as to enhance this effect. Furthermore, with the embodiment of FIG. 8 it is to be noted that the exhaust gases themselves are used to pump the liquid through the engine so that in this case also a water pump is unnecessary.

Instead of providing a simple manual control at the dash for the lever 276 which controls the richness or leanness of the mixture, it is possible to connect the lever 276 through any suitable linkage with the gas throttle so as to provide an automatic control of the richness of the mixture in this way. The main mixture control means 296 has no idling control and operates in a simple effective manner to provide with a single fine adjustment an exceedingly good mixture in a fully automatic manner.

When the engine of FIGS. 7 and 8 is idling, most of the exhaust gases will flow out through the outlet 374 of the housing 368, the choke valve 376 being almost closed at this time. However, when power is called for the exhaust gases will push the spring-loaded valve 376 to its open position so that the pressure is relieved and fresh air together with some exhaust gases flow into the fuel vaporizer 204. The manual control 378 is provided so as to maintain the valve 376 in its almost fully closed position when traveling out in the country away from the city, since at this time release of exhaust gases almost entirely to the outer atmosphere is not harmful. However, when driving in a crowded city, for example, the lever 378 is released to the automatic control of the engine so that a considerable part of the exhaust gases will be recirculated to reduce the extent of release of toxic fumes to the outer atmosphere in this case. Furthermore, it is possible to connect the valve 378 through the linkage 380 to the gas throttle so that when traveling above a certain speed on an open road away from the city the valve 376 will be almost closed while when traveling at low speeds, as when traveling within a city, the extent of air pollution will be reduced in the manner described above.

Of course, the embodiment of FIG. 8 is somewhat simpler than that of FIG. 7 in that it does not require any water tank 208 or supply 244 with all of the structure carried by the fuel tank 208. However, in this case water is required to be supplied to the water jacket 208 and the radiator 292 for circulation through the water jacket by the exhaust gases.

What is claimed is:

1. In a fuel vaporizer for internal combustion engines, a fuel tank for containing fuel which is to be vaporized, air inlet means, supply conduit means communicating with said air inlet means and with said tank for supplying air to the latter from said air inlet means, said supply conduit means having a fuel branch and an air branch and said supply conduit means directing air from said fuel branch into substantially greater intimate contact with fuel in the fuel tank than air in said air branch, so that said fuel branch provides a mixture which is richer in fuel than air from said air branch, and suction conduit means communicating with said tank for receiving air from both of said branches of said supply conduit means so as to combine the less rich air of said air branch with the richer mixture derived from said fuel branch, and said suction conduit means communicating with a suction inlet of an internal combustion engine for delivering thereto the fuel-air mixture derived from said tank.

2. The combination of claim 1 and wherein a muffler means receives exhaust gases from the internal combustion engine, said suction conduit means passing through said muffler means for deriving therefrom heat which raises the temperature of the mixture delivered to the suction inlet by said suction conduit means.

3. The combination of claim 1 and wherein a felt plate means extends into fuel in the fuel tank and is located in the immediate vicinity of said fuel branch for providing air therefrom with fuel vapors.

4. The combination of claim 3 and wherein said felt plate means includes a substantially horizontal felt plate located over fuel in the fuel tank to be soaked with fuel, said fuel branch including a tube located directly over said substantially horizontal felt plate and having a plurality of nozzles for directing air streams across said felt plate to receive fuel vapors therefrom, said suction conduit means having a hollow inlet located directly over said felt plate and formed with a plurality of apertures situated in the path of flow of streams issuing from said nozzles to receive the latter streams which are enriched by vapors from said felt plate and for directing the enriched air derived from said fuel branch to the suction inlet.

5. The combination of claim 4 and wherein said air branch leads directly from said air inlet means into said suction conduit means at a part thereof which is situated downstream of said hollow inlet thereof.

6. The combination of claim 5 and wherein a throttle means coacts with said air branch for controlling the flow of air through the latter.

7. The combination of claim 5 and wherein an idling conduit communicates with the hollow interior of said inlet of said suction conduit means for receiving a rich mixture therefrom and delivering it to the engine during idling.

8. The combination of claim 1 and wherein said fuel tank includes at an elevation higher than fuel therein a fuel tray and fuel supply and return tubes each communicating with the fuel in the fuel tank and with said tray, said fuel supply tube supplying fuel to said tray to flow along the latter and said return tube returning the fuel from said tray into said tank, said fuel branch of said supply conduit means communicating with said fuel supply tube at an elevation of said tank lower than the surface of fuel therein for providing an upward flow of air in said fuel supply tube to pump fuel into said tray, and said air branch communicating with said tank at an elevation higher than said tray for directing air over the latter to mix with air which is derived from said fuel supply tube, said suction conduit means communicating with said tank for receiving both the air from said air branch and the air from said tray.

9. The combination of claim 8 and wherein a perforated plate is situated over said tray to provide for flow of air rich in fuel vapors therefrom through said perforated plate, an upper plate situated over said perforated plate and defining a predetermined space therewith, said air branch communicating with said space, and a baffle situated in said tank distant from said fuel supply tube and forming an extension of said tray for directing air from said space and from said tray over said upper plate, said tank directing the latter air into a space situated over fuel in the tank, and baffle means communicating with the latter space over fuel in the tank and with the suction conduit means for directing the air from said space over said fuel through a path having baffles of said baffle means which direct the air-fuel mixture in a manner mingling the air from both branches into a homogeneous mixture before flowing through said suction conduit means to the engine.

10. The combination of claim 9 and wherein said tray is provided with longitudinal corrugations between which the fuel flows from said fuel supply tube toward said fuel return tube, and said tank having in its interior a reservoir communicating with said fuel supply tube for receiving fuel and air therefrom, said reservoir being formed with openings communciating with said tray for delivering fuel and air into the spaces between the corrugations thereof.

11. The combination of claim 10 and wherein a bypass conduit communicates on the one hand with said fuel branch upstream of said tank and on the other hand with the space in said tank over fuel therein for bypassing part of the air from said fuel branch directly into the space over fuel in said tank.

12. The combination of claim 1 and wherein a float means is situated in said tank floating on fuel therein, a perforated tube carried by said float means immersed in the fuel at an elevation lower than the upper surface thereof, said fuel branch communicating with said perforated tube so that air therefrom passes out of said perforated tube and bubbles up through a predetermined depth of fuel before reaching the space in said tank over the fuel therein, said air branch communicating directly with the latter space, and baffle means carried by said tank and communicating with said space for receiving the air from both branches and for eliminating excess fuel, said suction conduit means communicating with said baffle means for receiving the fuel-air mixture therefrom, and said baffle means having a return tube directing excess fuel from said baffle means back into said tank.

13. The combination of claim 12 and wherein a vacuum control means coacts with said air branch for regulating the flow of air therethrough into said space over said fuel in said tank.

14. The combination of claim 1 and wherein said tank has an air chamber situated over fuel therein and communicating with said suction conduit means, said air branch communicating with said air chamber, and suction valve means responding to suction from said suction conduit means and controlling the flow of air from said air branch into said chamber.

15. The combination of claim 14 and wherein an adjustable spring means coacts with said suction valve means for controlling the force required to open the same so as to regulate the richness of the mixture delivered by said suction conduit means to the engine.

16. The combination of claim 1 and wherein a water-contact means communicates with said supply conduit means upstream of said fuel and air branches for supplying to the latter air which has initially been placed in contact with water.

17. The combination of claim 16 and wherein said water-contact means includes a water tank for containing a supply of water, float means floating on water in said water tank, a perforated tube carried by said float means at an elevation submerged in water of said water tank, and said perforated tube communicating with said supply conduit means upstream of said fuel and air branches for directing air from said supply conduit means through water in the water tank before the air reaches said branches, both of said branches communicating with space in said water tank situated over water therein.

18. The combination of claim 17 and wherein a water supply means communicates with said water tank, and an automatic valve means operatively connected with said water supply means and with said float means for maintaining water in said water tank at a predetermined elevation therein.

19. The combination of claim 16 and wherein said water-contact means includes a cooling jacket of the internal combustion engine for containing cooling water for the engine, and a radiator communicating with said jacket for cooling water circulating through said jacket away from and back toward the latter through said radiator, exhaust gas conduit means directing exhaust gases of the engine through said radiator and water jacket to circulate cooling water through said radiator and jacket without the use of a water pump, and said exhaust gas conduit means communicating with said air inlet means for directing at least part of the exhaust gases into the latter to supply the latter with air which has been contacted with water which has been used to cool the engine, said air from said exhaust gas conduit means flowing into said supply conduit means to be delivered therethrough into said air and fuel branches.

20. The combination of claim 19 and wherein a main mixture control means communicates directly with said suction conduit means for receiving the fuel-air mixture therefrom and for controlling the supply of additional air thereto before the mixture reaches the suction inlet of the engine.

21. The combination of claim 1 and wherein a cooling jacket which is empty of water is provided for cooling the engine said suction conduit means having an upstream branch leading from said tank to said jacket to the suction inlet of the engine so that the fuel-air mixture which flows through said suction conduit means passes through said water jacket to cool the engine while receiving heat therefrom before reaching said suction inlet.

22. The combination of claim 21 and wherein a radiator communicates with said suction conduit downstream of said jacket for directing the heated mixture along a path where it is cooled by the radiator before reaching said suction inlet.

23. The combination of claim 22 and wherein a bypass conduit communicates with said suction conduit means upstream and downstream of said radiator and said bypass conduit carrying a temperature-responsive valve means for bypassing the mixture directly from said jacket to said suction inlet without passing through the radiator until a given temperature is reached by the fuel-air mixture.

24. The combination of claim 23 and wherein a main mixture control means communicates with said suction conduit means downstream of said radiator for automatically regulating the addition of more air to the mixture before it reaches said suction inlet.

25. The combination of claim 1 and wherein an exhaust gas conduit communicates with the engine for receiving exhaust gases therefrom and with said air inlet means for delivering at least part of the exhaust gases into the latter to flow through said supply conduit means and said branches thereof.

26. The combination of claim 25 and wherein a cooling means is in communication with said exhaust gas conduit for cooling the gases thereof before they reach said air inlet means.

27. The combination of claim 25 and wherein a valve means communicates with said exhaust gas conduit upstream of said air inlet means for controlling the amount of exhaust gases delivered into said air inlet.

28. The combination of claim 27 and wherein an adjusting means coacts with said valve means for adjusting the latter.

29. The combination of claim 27 and wherein a muffler means communicates with said exhaust gas conduit upstream of the location where it communicates with said air inlet means for at least partly cooling and cleaning the exhaust gases before they reach said air inlet means.

References Cited
UNITED STATES PATENTS

| | | | |
|---|---|---|---|
| 1,829,663 | 10/1931 | Mast | 123—133 |
| 2,312,151 | 2/1943 | Crabtree | 123—133 |

RALPH D. BLAKESLEE, *Primary Examiner.*